United States Patent [19]

Rota et al.

[11] Patent Number: 5,204,168
[45] Date of Patent: Apr. 20, 1993

[54] METAL LAMINATES, IN PARTICULAR FLEXIBLE METAL LAMINATES PRE-COATED WITH POWDER-BASE PAINTS AND CAPABLE OF BEING PLASTICALLY DEFORMED

[75] Inventors: Roberto Rota; Gavino Mura, both of Grassobbio, Italy

[73] Assignee: Otefal S.p.A., Grassobbio BG, Italy

[21] Appl. No.: 707,649

[22] Filed: May 30, 1991

[51] Int. Cl.$^5$ .................. B32B 7/02; B32B 15/04; B32B 15/20

[52] U.S. Cl. .................. 428/216; 427/227; 427/419.2; 428/323; 428/329; 428/331; 428/334; 428/457; 428/469; 428/472.2

[58] Field of Search .............. 428/331, 457, 469, 216, 428/323, 329, 334, 472.2; 524/141; 523/213; 427/419.2, 227

[56] References Cited

U.S. PATENT DOCUMENTS

| | | | |
|---|---|---|---|
| 4,148,970 | 4/1979 | McIntosh et al. | 428/469 |
| 4,639,476 | 1/1987 | Tajiri et al. | 523/213 |
| 4,698,099 | 10/1987 | Nakamura et al. | 524/141 X |

FOREIGN PATENT DOCUMENTS 3704479 2/1987 Fed. Rep. of Germany.

Primary Examiner—Thomas J. Herbert, Jr.
Attorney, Agent, or Firm—Collard & Roe

[57] ABSTRACT

Metal laminates pre-coated with powder-base paints and capable of being plastically deformed, wherein the coating layer comprises at least one polymeric compound, one cross-linking compound, one spreading compound, various additives, pigments and/or dyes and at least one filler, with said filler and/or said pigments being constituted, at least partially, by natural substances or substances of artificial origin, having a lamellar and/or acicular morphology, characterized in that the ratio of the largest dimension to the smallest dimension of the individual particles is higher than 2, with the granulometric distribution being such that the average equivalent sphere diameter is comprised within the range of from 0.2 to 4 micrometers.

10 Claims, No Drawings

1

METAL LAMINATES, IN PARTICULAR FLEXIBLE METAL LAMINATES PRE-COATED WITH POWDER-BASE PAINTS AND CAPABLE OF BEING PLASTICALLY DEFORMED

DESCRIPTION

The present invention relates to a metal laminate precoated with a powder-base paint, capable of being plastically deformed without undergoing alterations, crackings, detachments, or the like, of the applied paint coating. Also an improved process for the production of said metal laminate treated by means of a coating procedure with said powder-base paint falls within the scope of protection of the instant finding. It is well known that various types of metal laminates in the form of bands (coils), sheets, and the like, such as the aluminum or aluminum-alloy sheets, as well as the steel sheets and the zinc-coated sheets, are previously coated on either face, or on both of their faces, in order to render them capable of being used for the purposes of accomplishing wall panels, fixtures, semi-finished articles and things, or finished articles of various shapes, after being submitted to bending, perforation, cutting, drawing, and the like. Obviously, the type of paint or coating composition used should be capable of securing a perfect coating of the metal laminate and a safe adhesion to it, also after the various processing steps, in order to prevent unacceptable crevices, raisings, cracks, hindered failures and the like which are the cause of a fast corrosion of the metal laminate, and also create unaesthetical effects, in that they give the coated surface an unpleasant and opaque appearance from being formed.

Usually, the paints or coating compositions for these uses are constituted by a mixture comprising at least one resin (such as, e.g., a synthetic polymer or copolyner selected from the group consisting of polyesters, polyurethanes, phenolic compounds, epoxy compounds, fluorinated polymers, and the like), a cross-linking agent, a spreading agent, various additives, a pigment (such as $TiO_2$, $ZnO$, $Fe_2O_3$, $Al_2O_3$, lead chromates, and the like), as well as a filler, such as barium sulfate, calcium carbonate and the like; the functions performed by the filler are, as known, of endowing the paint with suitable characteristics of viscosity and of consistency, and of limiting, for merely economic reasons, the resin content of the paint, whilst the cross-linking agent performs the function of causing the polymerization and the thermosetting of the resing, and the spreading agent secures the spreading of the film in the liquid state before it polymerizes.

Normally, the paints or coating compositions presently used for the purpose of colouring and protecting aluminum and aluminum-alloy, steel and zinc-coated steel laminates either in their pristine state, or pretreated by phosphating or chromate treatments from corrosion, belong to two types: one type is constituted by paints and coating compositions in the liquid state, and the second type is of the paints and coating compositions in the solid state i.e., in powder form. The "liquid-base paints" are diluted in a suitable solvent and are applied by spraying or are spread on the laminate by means of rollers, in one or more painting passages; by means of a following treatment of oven heating, the solvent is caused to evaporate off and the resin is caused to polymerize. This type of paints are endowed with extremely good characteristics of adhesion and of flexibility, so that thet can easily withstand deformations by bending and drawing, as well as perforation operations or milling operations, without the coloured coating layer undergoing any detachments at the edges of the cut; but they suffer anyway from some severe disadvantages, among which the need of removing the solvent, which in general is strongly toxic and polluting, with considerable increases in manufacturing costs, and with a diffused porosity being generated in the coating layers, which can be increased during the subsequent machining steps, generating undesirable ways for moisture and for the corrosive and/or polluting substances in particular when the coated laminates are used in outdoor applications, in marine environments, in industrial atmospheres or are used for outdoor installation in large towns.

Furthermore, if a good covering has to be obtained, two or three successive layers have frequently to be applied, with consequent additional economic burdens. The "powder-base paints" are applied by electrostatic spraying by means of known equipment pieces, without any use of solvents, with the consequent drawback of such a solvent having to be evaporated and recovered from the evaporation fumes; they offer the advantage that they can be applied as high-thickness layers in one coating pass, and that they are much less porous than the liquid-base paints, with a consequent higher corrosion resistance. However, such a higher corrosion strength is not retained, in case of the powder-base paints of the type known from the prior art, after the operations of bending, drawing and shaping and after suffering impacts, owing to the tearing the film can undergo, with drawbacks of also aesthetical nature being caused.

Summing-up, therefore, the presently available powder-base paints, although secure an extremely good, and perhaps the best, protection of the metal substrate from corrosion, as well as the perfect adhesion or capability of getting coupled with the same metal substrate, they show characteristics of processability and, in particular, of deformability, which are sometimes regarded as insufficient.

The main purpose of the present invention is of providing a metal laminate, e.g., in the form of a band (coil), a sheet, or the like, pre-coated by means of the powder-base type of paints, which pre-coated laminate is endowed with high characteristics of processability, in particular by drawing, bending, and the like, of being cut, perforated and milled without the paint layer showing any chippings at its edges, with reduced thicknesses of the coating layer as compared to those which are required by the powder-base paints known from the prior art, and therefore such as to make it possible considerable economic and practical advantages to be achieved.

Another purpose of the invention is of providing a pre-coated metal laminate, in particular a pre-coated laminate of aluminum or aluminum alloys, by using a powder-base paint to be applied by electrostatic spraying, which is capable of displaying, besides an extremely good protection of the metal substrate, a high corrosion resistance and impact strength, with self-explanatory advantages are regards the pre-coated laminates for outdoor use, or for use as building components, as car components or as motor-car accessories.

A further purpose of the present invention is of providing an improved process for the practical production of the flexible laminates pre-coated with the powder-base paint, capable of being plastically deformed, as hereinabove specified.

These and still other purposes, which can be more clearly evidenced by the following disclosure, are achieved by a metal laminate pre-coated with powder-base paints and capable of being plastically deformed, wherein the paint layer comprises at least one synthetic polymer or copolymer, one cross-linking agent, one spreading agent, various additives, one dye and/or one pigment, and one filler, which pre-coated metal laminate is characterized in that said filler and/or said pigment are products at least partially constituted by particles having a lamellar morphology and/or an acicular morphology. More particularly, the value of the average ratio of the largest dimension to the smallest dimension of the individual particles is higher than 2, and is preferably comprised within the range of from 3 to 50, i.e., is such that the same particle has the structure of a thin slab or of an elongated prism, as one can see at the optical or electronic microscope, with a substantial flexibility under pressure, or under an impact. Said fillers and/or pigments have then such a granulometric distribution that the average equivalent sphere diameter is comprised within the range of from 0.2 to 4 micrometers, and is preferably comprised within the range of from 0.4 to 2.5 micrometers.

By "average equivalent sphere diameter", the diameter is herein meant of the sphere which has a volume equivalent to the volume of the average-size particle. Said fillers and/or pigments are customarily selected from the group comprising oxides, hydroxides, silicates and still further products of natural origin, or obtained by means of artificial processes, either in pure form, or mixed with one another.

In particular, very good results are obtained according to the present invention when fillers are used, which are constituted by complex aluminum silicates of natural origin having a lamellar composition and with the following compositions and characteristics:

| | |
|---|---|
| $Al_2O_3$ | from 35 to 46% by weight; |
| $SiO_2$ | from 45 to 53% by weight; |
| $TiO_2$ | from 0.5 to 2% by weight; |
| $Fe_2O_3$ | from 0.3 to 1.5% by weight; |
| $Na_2O$ | from 0.05 to 0.3% by weight; |
| $K_2O$ | from 0.05 to 0.2% by weight; |
| CaO | from 0.01 to 0.1% by weight; |
| MgO | 0.05% by weight at maximum |
| Calcination loss: from 0.2 to 15% by weight | |
| Refractive index: $n_D^{20}$ = from 1.55 to 1.65 | |
| True specific gravity: from 2.5 to 2.7 g/ml | |
| Bulk specific gravity (after tamping): from 0.30 to 0.75 g/ml | |
| Bulk specific gravity (without tamping): from 0.15 to 0.50 g/ml | |
| Average equivalent sphere diameter: from 0.6 to 2 micrometers | |

Said products are possibly first submitted to suitable processes capable of improving their purity, their morphology, or their granulometric distribution, such as washing with water or with proper reactants, grinding by means of equipment capable of breaking, as well as of cleaving into flake's or prisms the original crystals, sieving and/or sorting by means of water or air, crystallization from a suitable solvent in case the matter is of an organic pigment, or to thermal treatments aiming at either totally or partially removing the crystallization water possibly contained in the starting material, and/or to surface treatments of the particles, such as, e.g., the vinylation or the aminosilanization, such as to modify the adhesion strength of said particles to said resin and/or other properties thereof, such as their hydrophilic properties or their optical properties.

Said surface treatments of said particles can be carried out by means of the addition of proper reactants directly into the formulation of the paint. Said products with lamellar and/or acicular morphology can be used in the formulation of the paints mixed with one another in any proportions, and also together with products of different morphology known as conventional fillers and/or pigments, as a function of the specific characteristics of each individual material. The products with lamellar and/or acicular morphology to be used as pigments are constituted by natural and/or artificial substances having their own colour, or which have been submitted to such surface treatments of the particles, as to deposit on them a film of substances having their own colour, or a film of controlled thickness, such as to generate interference colours. The total content of the products with lamellar and/or acicular morphology according to the present invention, relatively to that portion of the formulation which comprises the fillers and the pigments, is comprised within the range of from 1 to 100% by weight, and is preferably comprised within the range of from 10 to 80% by weight, with the different proportions between the various formulations depending on the specific characteristics of the lamellar and/or acicular compounds used, on those of the other substances contained in the composition, and on those required for the film.

Said content of lamellar and/or acicular products is comprised within the range of from 1 to 50%, when referred to the total weight of the paint.

Still according to the present invention, a suitable process for manufacturing said pre-coated metal laminate comprises the following operating steps:

an initial treatment of degreasing, of pickling, of phosphating or of chromate-treatment, or another treatment known from the prior art for the laminates of aluminum or of steel or of zinc-coated steel or the like, is carried out on the laminate;

on said laminate at least one layer is then applied, also by means of a continuous processing mode, of a powder-base paint constituted by at least one polymeric substance selected from the group comprising polyesters, polyurethanic compounds, phenolic compounds, epoxy compounds, fluorinated polymers, and the like, by various additives, by at least one cross-linking agent and at least one spreading agent, by at least one pigment and/or dye, and/or by at least one filler, with said pigment and/or said filler being either totally or partially constituted by products with a lamellar and/or acicular morphology.

In order to formulate the paint, once that the necessary pigmentation is established, the filler is formulated by selecting the product(s) and its(their) respective amount(s) on the basis of their typical chemical and/or morphological specifications, with the effect of the various compounds being hence balanced, on considering the end composition of the paint and, if necessary, changing said end composition as well as the required performance.

The amount of filler is generally smaller that the necessary amount when the traditional fillers, such as barium sulfate, calcium carbonate, and the like, are used. A portion of these fillers is used often in order to enhance certain characteristics, buth in such an amount as not to jeopardize the capability of the film of being deformed.

Comparative tests were carried out on laminates prepared from aluminum alloys, which are particularly capable of withstanding high cold deformation values (3003 and 3103 H 112), with finishing coatings of traditional powder-base paints, and powder-base paints according to the instant finding.

On the market, various laminates pre-coated with liquid-base paints, of various colours, produced by different manufacturers, and various non-coated laminates of the same type, and from the same source, were purchased. The latter were pre-treated and finished with coatings obtained from powder-base paints according to the instant invention and from powder-base paints, of various colours, from several manufacturers. From said tests the following results were obtained:

a) The minimum thickness of the layers of powder-base paints, which is necessary in order that a good covering may be obtained, is of about 60 micrometers for the powder-base paints known from the prior art; for the powder-base paints according to the instant finding, said minimum thickness is of about 40–50 micrometers.

The thickness of the film applied to the laminates pre-coated with liquid-base paints resulted to be comprised within the range of from 20 to 23 micrometers.

b) When laminates coated with layers of 60 micrometers of powder-base powders known from the prior art were submitted to the impact test according to ECCA T5 (European Coil Coating Association), an impact strength was found, which was comprised within the range of from 2.5 to 6 Nm, expressed as the impact energy.

In case of higher values, the films showed clefts and/or detachments.

In case of laminates coated with powder-base paints according to the instant invention and with layer thicknesses comprised within the range of from 40 to 60 micrometers, no failures were found in the film after impacts of energy of 22.5 Nm.

Similar results to these were obtained in case of laminates pre-coated with liquid-base paints.

c) The drawing test according to ISO 1520 (slow deformation rate) yielded a result of 8 mm of drawing depth without the film incuring breakages in case of powder-base paints known from the prior art, and of more than 9 mm (laminate tensile strength) in case of powder-base paints according to the invention, and in case of liquid-base paints.

d) The bending test according to ECCA T12 gave for the powder-base paints known from the prior art results ranging from T3 to T6 values, i.e., the laminates showed clefts in the coating films when they were bent by 180° around spindles having a diameter respectively smaller than the triple or the sextuple of the thickness of the laminate.

In case of laminates coated with the powder-base paints according to the instant invention, or pre-coated with the liquid-base paints, no defects were found in the film even after a 0T bending, i.e., after a splindleless bending by 180°, except for some samples coated with a liquid-base paint, which showed small cracks.

e) The accelerated-corrosion test inside the Kesternich chamber according to UNI 5085 (DIN 50018 SFW 2.0 S) was carried out for 15 cycles on the three types of samples. The laminates coated with the powder-base paints known from the prior art (layers of about 60 micrometers) and with powder-base paints formulates according to the present invention (layers of from 40 to 50 micrometers) arrived to the end of this hard test in a practically undamaged condition, apart from a slight loss in gloss, and a sligh change in shade of some colours.

The laminates pre-coated with the liquid-base paints showed already after round 10 cycles, stains, opacifications, and the formation of some bubbles.

At the end of the test, they showed a decided opacification, many bubbles, film wrinklings and large stains.

The difference in behaviour was hence very sharp, and witnesses the higher protection offered by the use of the powder-base paints than as offered by the liquid-base paints, whilst between the two types of powder-base paints, notwithstanding the differences in coating thickness, no meaningful differences emerged.

From the tests carried out it results that the films obtained with the powder-base paints according to the instant invention not only are much more capable of being deformed than the films obtained from the powder-based paints known from the prior art, but they also offer better guarantees then as offered by the liquid-base paints, heretofore uncontested in the field of the laminates destined to successive deformations.

Therefore, the use of the type of powder-base paint with fillers and/or pigments of lamellar and/or acicular structure according to the present invention secures an as good as possible protection to the metal laminate, in particular when this latter is used outdoor in a marine environment or in an industrial atmosphere, or in large, polluted towns, as well as a possibility of plastic processing, which cannot be obtained with the powder-base paints presently available from the market. Other, not minor, advantages achieved by the present invention are the possibility of obtaining identical finishings on laminates coated by means of a continuous coating process and on extruded articles painted with a powder-base paint, a currently very widely diffused finish, with the possibility of joint uses presently unproposable in case of laminates coated with the liquid-base paints, which have very different appearance and colours. Obviously, into the forms of practical embodiment of the pre-coated laminates according to the present invention modifications and variants may be brought as regards the polymeric materials used as the base materials, the dyes and the additives, as well as regards the conditions of application of the paint to the metal substrate, according to as required, without departing from the scope of protection of the same invention.

We claim:

1. A metal laminate pre-coated with powder-base paints and capable of being plastically deformed without any loss of continuity of the paint layer, the paint layer comprising at least one additive selected from the group consisting of a filler, a pigment, and the mixtures thereof;

wherein said filler and said pigment are at least partially constituted by a product selected from the group consisting of a natural product and a synthetic product having a structure selected from the group consisting of lamellar and acicular, the total amount of said product being comprised within the range of from 1% to 50% by weight relative to the total weight of said paint layer, wherein said filler is a complex aluminum silicate having composition and characteristics comprised within the following ranges:

| | |
|---|---|
| Al$_2$O$_3$ | from 35 to 46% by weight; |
| SiO$_2$ | from 45 to 53% by weight; |
| TiO$_2$ | from 0.5 to 2% by weight; |
| Fe$_2$O$_3$ | from 0.3 to 1.5% by weight; |
| Na$_2$O | from 0.05 to 0.3% by weight; |
| K$_2$O | from 0.05 to 0.2% by weight; |
| CaO | from 0.01 to 0.1% by weight; |
| MgO | up to 0.05% by weight |
| Calcination loss: | from 0.2 to 15% by weight |
| Refractive index $n_D^{20}$: | from 1.55 to 1.65 |
| True specific gravity: | from 2.5 to 2.7 g/ml |
| Bulk specific gravity: (after tamping) | from 0.30 to 0.75 g/ml |
| Bulk specific gravity: (without tamping) | from 0.15 to 0.50 g/ml |
| Average equivalent sphere diameter: | from 0.6 to 2 μm. |

2. A metal laminate pre-coated with a layer of 30 to 95 μm obtained by applying a powder-base paint and capable of being plastically deformed without any loss of continuity of the paint layer, the paint layer comprising:
   at least one additive selected from the group consisting of a filler, a pigment, and the mixtures thereof; wherein said filler and said pigment are at least partially constituted by one or more products selected from the group consisting of natural and synthetic oxides, hydroxides, silicates and mixtures thereof having a structure selected from the group consisting of lamellar and acicular and mixtures thereof;
   the total amount of said products being comprised within the range of from 5% to 35% by weight relative to the total weight of said paint layer, and within the range of from 14.5% to 100% by weight, relative to the total weight of the fillers and pigments contained in said paint layer;
   said products being constituted by particles of such dimensions that the value of their average equivalent sphere diameter is comprised within the range of from 0.2 to 4 μm, and the value of their average length is less than or equal to 6 μm, and in which the ratio of the largest dimension to the smallest dimension is comprised within the range of from 10 to 30.

3. A metal laminate pre-coated with a layer of 30 to 95 μm obtained by applying a powder-base paint and capable of being plastically deformed without any loss of continuity of the paint layer, the paint layer comprising:
   at least one additive selected from the group consisting of a filler, a pigment, and the mixtures thereof; wherein said filler and said pigment are at least partially constituted by one or more products selected from the group consisting of natural and synthetic oxides, hydroxides, silicates and mixtures thereof having a structure selected from the group consisting of lamellar and acicular and mixtures thereof;
   the total amount of said products being comprised within the range of from 1% to 40% by weight relative to the total weight of said paint layer, and within the range of from 2.5% to 100% by weight, relative to the total weight of the fillers and pigments contained in said paint layer;
   said products being constituted by particles of such dimensions that the value of their average equivalent sphere diameter is comprised within the range of from 0.2 to 4 μm, and the value of their average length is less than or equal to 6 μm, and in which the ratio of the largest dimension to the smallest dimension is comprised within the range of from 3 to 50.

4. A metal laminate according to claim 3, wherein said products consisting of natural and synthetic products having a structure selected from the group consisting of lamellar and acicular and mixtures thereof, prior to incorporation into said paint, are submitted to washing with a liquid selected from the group consisting of water and another suitable solvent.

5. A metal laminate according to claim 3, wherein said products selected from the group consisting of natural and synthetic products having a structure selected from the group consisting of lamellar and acicular, prior to incorporation into said paint, are submitted to grinding, i.e., delamination, in order to break the original crystals into the laminar (flakes) or elongated prismatic parts (prisms) they are constituted of.

6. A metal laminate according to claim 3, wherein said products selected from the group consisting of natural and synthetic products having a structure selected from the group consisting of lamellar and acicular, prior to incorporation into said paint, are submitted to thermal treatment partially or totally removing the crystallization water contained in said product.

7. A metal laminate according to claim 3, wherein said products selected from the group consisting of natural and synthetic products having a structure selected from the group consisting of lamellar and acicular, are submitted to surface treatment of vinylation or aminosilanization modifying the adhesion strength of said particles to said polymer, their hydrophilic properties, their optical properties, with said surface treatment of said particles being carried out prior to incorporation into said paint, or by means of the addition of a reactant directly into the formulation of the paint.

8. A metal laminate according to claim 3, wherein said filler is a complex aluminum silicate having composition and characteristics comprised within the following ranges:

| | |
|---|---|
| Al$_2$O$_3$ | from 35 to 46% by weight; |
| SiO$_2$ | from 45 to 53% by weight; |
| TiO$_2$ | from 0.5 to 2% by weight; |
| Fe$_2$O$_3$ | from 0.3 to 1.5% by weight; |
| Na$_2$O | from 0.05 to 0.3% by weight; |
| K$_2$O | from 0.05 to 0.2% by weight; |
| CaO | from 0.01 to 0.1% by weight; |
| MgO | up to 0.05% by weight |
| Calcination loss: | from 0.2 to 15% by weight |
| Refractive index $n_D^{20}$: | from 1.55 to 1.65 |
| True specific gravity: | from 2.5 to 2.7 g/ml |
| Bulk specific gravity: (after tamping) | from 0.30 to 0.75 g/ml |
| Bulk specific gravity: (without tamping) | from 0.15 to 0.50 g/ml |
| Average equivalent sphere diameter: | from 0.6 to 2 μm. |

9. A process for manufacturing a laminate of a substrate selected from the group consisting of aluminum and steel pre-coated with powder-base paint comprising the steps of:
   pretreating said substrate according to the usual practices for obtaining a good adhesion; and
   applying to said substrate at least one layer being a powder-base paint comprising at least one additive selected from the group consisting of a filler, a pigment and the mixtures thereof, wherein said filler and said pigment are at least partially constituted by products which have a structure selected from the group consisting of lamellar and acicular and mixtures thereof, the total amount of said products being comprised within the range of from 1% to 40% by weight relative to the total weight of said paint layer, and within the range of from 2.5% to 100% by weight, relative to the total weight of the fillers and pigments contained in said paint layer, said products being constituted by particles of such dimensions that the value of their average equivalent sphere diameter is comprised within the range of from 0.2 to 4 μm, and the value of their average length is less than or equal to 6 μm, and in which the ratio of the largest dimension to the smallest dimension is comprised within the range of from 3 to 50.

10. A process according to claim 9, wherein said applying of said powder-base paint is carried out continuously; and wherein said substrate is a coil.

* * * * *